March 16, 1954
K. L. HUJSAK ET AL
CATALYTIC CONVERSION OF OXYGENATED
ORGANIC COMPOUND MIXTURES
Filed June 29, 1949
2,672,476
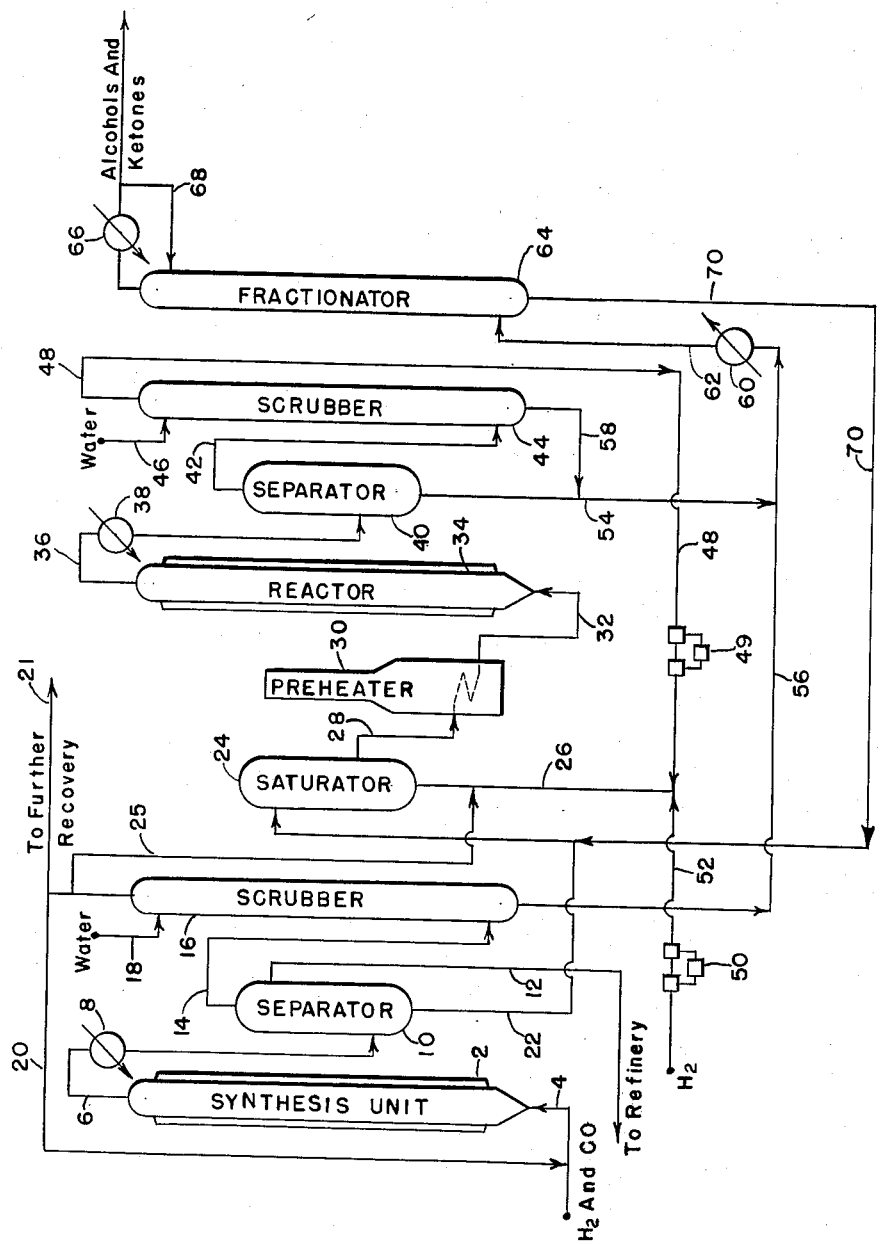
INVENTORS
KAROL L. HUJSAK
RICHARD MUNGEN
BY
ATTORNEY Patented Mar. 16, 1954

2,672,476

UNITED STATES PATENT OFFICE 2,672,476

CATALYTIC CONVERSION OF OXYGENATED ORGANIC COMPOUND MIXTURES

Karol L. Hujsak and Richard Mungen, Tulsa, Okla., assignors to Stanolind Oil and Gas Company, Tulsa, Okla., a corporation of Delaware Application June 29, 1949, Serial No. 101,987

15 Claims. (Cl. 260—450)

Our invention relates to novel improvements in the art of manufacturing hydrocarbons and oxygenated organic compounds by the reduction of carbon monoxide with hydrogen in the presence of a catalyst. More particularly, it pertains to a method whereby the composition of an oxygenated organic chemicals fraction of the type obtained in the aforesaid reaction of carbon monoxide with hydrogen may be voluntarily controlled.

In accordance with the now generally practiced modification of the Fischer-Tropsch synthesis, carbon monoxide and hydrogen in a ratio of about 1:2 are introduced into a suitable reactor at temperatures of from 260° to 370° C. and pressures of the order of 150 to 550 p. s. i. and are catalytically converted into a product mixture containing hydrocarbons, oxygenated organic compounds, and water. Thereafter this mixture is further separated into a gas phase, a liquid hydrocarbon phase, and a water phase. While this reaction is generally associated with the synthesis of hydrocarbons, predominantly of the gasoline boiling range, or the synthesis of hydrocarbons which can readily be converted into a fraction boiling in the aforesaid range, such reaction is likewise a very valuable source of certain oxygenated organic chemicals including aldehydes, ketones, acids, and alcohols. This chemicals fraction may frequently constitute as much as 25 weight per cent or more of the total, viz., hydrocarbons plus chemicals, and is generally found to be substantially equally distributed in the hydrocarbon or oil and water phases. The quantity of chemicals involved in a reaction of this type may be further appreciated when it is realized that the daily production of total chemicals from hydrocarbon synthesis plants now designed for commercial purposes is of the order of 500,000 pounds. However, the complexity of such chemical mixtures, even after they have been split into oil and water soluble fractions, has apparently discouraged some of the principal workers in this field from attempting to isolate these materials in a substantially pure state. In the past a proposed solution to this problem has consisted of recycling the water soluble chemicals back to the synthesis unit where they were mixed with synthesis gas and converted predominantly to gasoline hydrocarbons. It has been further proposed to remove the oil soluble chemicals from the oil phase, for example, by extraction with a suitable solvent, separate the chemicals from the resulting extract and thereafter recycle them to the synthesis reactor where they were converted chiefly into gasoline hydrocarbons. If, on the other hand, it was desired to recover the oil and water soluble chemicals fraction, this object was accomplished by means of a series of complicated chemical and physical separation steps. It will be apparent to those skilled in the art, however, that because of the extreme difficulty encountered in the separation of the complex chemical mixtures involved, viz., the separation of a single component from an azeotropic mixture in which the other components form azeotropes with one another as well as with the component which it is desired to isolate, any system capable of satisfactorily accomplishing this object will add many thousands of dollars to the total construction cost of a commercial plant.

It is therefore an object of our invention to provide a method whereby the composition of the water soluble chemicals fraction, as well as the oil soluble chemicals fraction, if desired, may be controlled, thus rendering our process extremely flexible and making possible the production of only those chemicals that are economically attractive at current market conditions. A further object of our invention is to provide a method by which a selected class or classes of chemicals may be continuously produced to the exclusion of other classes of chemicals present in the feed mixtures employed.

Broadly, our invention contemplates subjecting chemical mixtures of the general type encountered in the hydrocarbon synthesis process to the action of hydrogen in the presence of a catalyst at temperatures and pressures which may, although not necessarily, fall within the ranges employed in the hydrocarbon synthesis. Our invention, however, is not limited to the conversion of compounds typical of those produced by the aforesaid synthesis; but, on the contrary, is applicable to other compounds not produced thereby but which belong to the same class or classes as those formed in hydrocarbon synthesis. In accordance with one embodiment of our invention, the mixture of chemicals is introduced, together with from about 1 to 4 parts of hydrogen per part of feed, into a reactor of the general design employed in hydrocarbon synthesis where conversion occurs in the presence of a suitable fluidized catalyst such as, for example, a hydrocarbon synthesis catalyst, at a temperature of from about 125° to about 360° C. at pressures of 15 p. s. i. and higher. Thus, in accordance with our invention, an aqueous mixture of chemicals containing, for example, 8 per cent by weight of organic oxygenated compounds, at relatively low temperatures and high pressures (125° to 175° C. and 200 to 600 p. s. i. or higher) when employing approximately one volume of hydrogen for each volume of feed mixture, there is obtained an increase in the alcohol content of said mixture at the expense of the aldehydes present therein. The relative proportion of other components in the system remains substantially unchanged. However, if relatively low temperatures and pressures (125° to 175° C. and 15 to about 100 p. s. i.) are employed together with the same ratio of hydrogen to feed mixture, the concentration of ketones is greatly increased at the expense of alcohols, aldehydes, and acids. Also, by employing both high temperatures and pressures (285° to 350° C. and 200 to 600 p. s. i. and above), moderate increases in concentration of both alcohols and ketones at the expense of aldehydes and acids are obtained. The ratio in which alcohols and ketones are produced may be varied by increasing the pressure or hydrogen concentration or both. The maximum temperature at which the reaction can be operated to produce an increase in yield of the desired class or classes of chemicals depends upon the composition of the feed, the concentration of hydrogen, and the pressure employed.

The composition of the chemical feed mixture may vary widely; however, in the majority of instances the feed should contain at least 5 weight per cent chemicals and at least 5 weight per cent water. In employing the process of our invention in conjunction with the hydrocarbon synthesis process, we have found it desirable to use feeds, viz., primary water (the aqueous phase in the original hydrocarbon synthesis product mixture) in which the chemicals (ketones, aldehydes, acids, and alcohols) are present to the extent of from about 5 to 15 weight per cent, usually about 7.5 weight per cent. In general, the majority of chemicals present in the primary water comprise essentially acetaldehyde, ethanol, acetic acid, and acetone with smaller amounts of isopropyl alcohol, n-butanol, methyl propyl ketone, methyl ethyl ketone, propionic acid, etc. Such compounds present in smaller amounts are hereinafter referred to as "other chemicals." If desired, the feed composition may be further varied by adding thereto substantially hydrocarbon free mixtures of aldehydes, acids, and alcohols derived from the oil soluble fraction produced in hydrocarbon synthesis to obtain in increased concentration one or more of the classes of chemicals normally occurring in said oil soluble fraction. In addition to feed mixtures of the composition indicated above, we may likewise employ in the process of our invention mixtures consisting essentially of acids in the form of dilute, i. e., about 5 weight per cent, aqueous solutions or substantially anhydrous mixtures of acids. Furthermore, individual acids may be utilized in dilute or relatively concentrated form. Thus, we have found that the acid fraction derived from the first step in the separation of the various classes of chemicals contained in the primary synthesis water constitutes a highly satisfactory feed mixture. When employing such a feed, we have obtained high conversion of the acids over a hydrocarbon synthesis catalyst to aldehydes and alcohols.

While the process of our invention referred to above and more specifically described below is disclosed generally in terms of vapor-phase operation, it is to be strictly understood that we do not limit ourselves to such operating conditions, inasmuch as batch or continuous liquid phase operations may be advantageously employed with various combinations of feed mixtures and catalysts as specifically illustrated by Example II. Also, in carrying out our invention the vapor phase conversion of oxygenated chemicals in accordance therewith may, if desired, be effected in reactors having fixed instead of fluidized catalyst beds.

The catalyst employed in effecting our invention may be any of several catalysts that have previously been shown to be capable of promoting hydrogenation, including the known hydrocarbon synthesis catalysts as well as other catalysts such as, for example, copper chromite, palladium, platinum oxide, and the like. In fluidized bed operations the catalyst is preferably employed in amounts such that the density of the catalyst bed ranges from about 65 to 100 pounds per cu. ft., and preferably 85 to about 100 pounds per cu. ft. in the case of iron. The catalyst is maintained in a fluidized state under the reaction conditions employed by introducing the feed mixture in vaporous form at a linear velocity of between about 0.1 and 2.0 ft. per second. The concentration of catalyst employed in liquid phase processes may vary widely and, in general, will be determined by the activity of the particular catalyst employed. Thus, for example, with iron type hydrocarbon synthesis catalysts, we prefer to use approximately 1 pound of catalyst for each 0.2 to 0.5 mole of reaction mixture. Other catalysts, such as palladium, platinum oxide, and the like, which are normally regarded as more active catalysts than iron, may be employed in substantially lower concentrations than those herein recommended for iron. In this connection, while temperatures of at least about 125° C. are desirable when employing hydrocarbon synthesis catalysts, temperatures as low as about 20° C. may be utilized with the more active catalysts such as those just mentioned.

Our invention may be further illustrated by reference to the accompanying drawing where hydrogen and carbon monoxide in a molar ratio of about two moles of hydrogen to one mole of carbon monoxide are obtained from a source not shown and introduced into synthesis unit 2 through line 4. In synthesis unit 2 the reactants may be subjected to contact with a catalyst such as, for example, iron mill-scale, in the form of a fluidized mass of finely divided solid particles. The reaction is effected at temperatures of the order of 260° to 360° C. and at pressures in the range of 150 to 400 p. s. i. to yield a liquid hydrocarbon phase and an aqueous phase. The products of this reaction are withdrawn from synthesis unit 2 through line 6 and condenser 8 into separator 10 where the liquid oil phase is withdrawn to the refinery through line 12 and the uncondensed gases, containing unreacted synthesis gas and normally gaseous products of conversion including ethane, methane, carbon dioxide, etc., leave separator 10 through line 14 and are introduced into scrubber 16 where the gas phase is countercurrently contacted with water introduced at the top of scrubber 16 through line 18. Gases such as carbon dioxide, methane, ethane, etc., may, if desired, be partially recycled to feed line 4 via line 20 where they are mixed with fresh feed and introduced into synthesis unit 2. The balance of these products may be sent through line 21 to a recovery system (not shown) where the gaseous components are recovered and further refined, if desired. The water layer from separator 10 is withdrawn through line 22 and transferred to saturator 24 where it is mixed with hydrogen introduced through line 26. The conditions prevailing in saturator 24 are preferably such that a vaporous mixture is obtained consisting essentially of 50 weight per cent hydrogen and 50 weight per cent primary water. To achieve vaporous mixtures in the saturator of the aforesaid general composition, temperatures varying from about 80° C. at 15 p. s. i. to about 212° C. at 550 p. s. i. should ordinarily be employed. After the mixture of hydrogen saturated with primary water has been thus formed, it is withdrawn from saturator 24 through line 28 and introduced into preheater 30 where it is brought to reaction temperature, viz., 285° to 360° C., and thereafter introduced through line 32 into reactor 34 containing mill-scale catalyst in fluidized form. The temperature of reactor 34 is preferably maintained within the range of 285° to 360° C.; however, pressures of from 15 p. s. i. to 600 p. s. i. or higher, may be employed, if desired. The product mixture is withdrawn from reactor 34 through line 36 and condenser 38 into separator 40 where the uncondensed products are withdrawn through line 42 and introduced into scrubber 44 where they are countercurrently contacted with water introduced in the top of scrubber 44 through line 46. The uncondensed gas phase issuing from scrubber 44 and which consists essentially of hydrogen is transferred through line 48 where it is mixed with make-up hydrogen pumped in at the desired pressure by means of compressor 50 through line 52. The make-up hydrogen and recycle hydrogen from line 48 are then combined and introduced under pressure into saturator 24 via compressor 49 and line 26. In this connection, if desired, an additional source of hydrogen may be furnished in the form of a carbon monoxide-lean tail gas from line 20 and introduced into line 26 where it is mixed with fresh hydrogen at the required pressure. However, if hydrogen from line 20 is to be employed along with make-up hydrogen in saturator 24, care should be exercised to prevent the introduction of tail gas from line 20 which contains in excess of from 2 to 3 per cent carbon monoxide. Higher carbon monoxide concentrations tend to promote the formation of hydrocarbons under the prevailing conditions—a result which it is our specific desire to avoid. The aqueous fraction in separator 40 containing water soluble chemicals and having alcohols or ketones, or both, in increased ratio to the remaining chemical components thereof is withdrawn through line 54 and combined with scrubber water in lines 56 and 58 from scrubbers 16 and 44, respectively, after which the combined fractions are conducted through reboiler 60 and introduced by means of line 62 into fractionator 64 where the alcohols or ketones, or both, may be taken off overhead through condenser 66 and a portion of the condensate returned through line 68 to the top of the column as reflux. Further purification of the overhead fraction thus obtained may be effected in a known manner if considered necessary or desirable. The impurities separated from the ketones and alcohols may thereafter be combined with the primary water in line 22 and thus be converted into the desired products, as indicated above. The bottoms portion which represents a relatively concentrated mixture of chemicals is withdrawn from fractionator 64 through line 70 and may be, if desired, combined with primary water in line 22 and the resulting mixture introduced into saturator 24. By the foregoing expedient, all of the chemicals present in the primary water stream may be converted into the desired class or classes.

In the above-mentioned drawing reference to certain equipment such as pumps, gages, valves, and the like which obviously would be necessary to operate the process has been intentionally omitted. Only sufficient equipment has been diagrammatically shown to illustrate the process, and it is intended that no undue limitation be read into our invention by reference to the drawing and description thereof.

Specific applications of the process of our invention to both liquid and vapor phase systems are further illustrated by the examples which follow.

EXAMPLE I

A primary water stream from a hydrocarbon synthesis operation at 315° C. and 450 p. s. i. pressure having the following composition

| Component | Moles |
|---|---|
| $CH_3CHO$ | .42 |
| $CH_3CH_2OH$ | 2.66 |
| $CH_3COOH$ | .75 |
| $H_2O$ | 92.93 |
| $CH_3COCH_3$ | .40 |
| Other chemicals | 2.84 | was mixed at 82° C. and 15 p. s. i. pressure with hydrogen in a ratio of 1:1 and the resulting vaporous mixture introduced into a conventional hydrocarbon synthesis type reactor where said mixture was brought into contact with a fluidized iron catalyst. The catalyst was maintained in a suspended turbulent state by introducing the reaction mixture at a linear velocity of about 1 ft. per second. The temperature of the synthesis zone during the reaction was maintained at about 150° C., while the pressure was held at about 15 p. s. i. Analysis of the synthesis tail gas indicated a product mixture of the following composition with a percentage gain in acetone of 250 weight per cent over that present in the original feed as shown below:

| Component | Reaction Mixture, Moles | Product Mixture, Moles | Percent Gain |
|---|---|---|---|
| $CH_3CHO$ | .21 | .011 | |
| $CH_3CH_2OH$ | 1.33 | .619 | |
| $CH_3COOH$ | .37 | .280 | |
| $H_2O$ | 46.47 | 46.06 | |
| $CH_3COCH_3$ | .20 | .70 | 250 |
| $H_2$ | 50.00 | 51.62 | |
| $CO_2$ | 0 | .50 | |
| Other chemicals | 1.42 | 1.42 | |

It should be noted that the fraction in both the reaction and product mixture designated as "other chemicals" did not change. In so far as total chemicals in this fraction are concerned, this is true; however, the proportion of ketones present therein compared to that in the reaction mixture was increased essentially by the same order of magnitude as was observed in the case of acetone.

EXAMPLE II

A primary water stream from a hydrocarbon synthesis operation at 315° C. and 450 p. s. i. pressure was introduced into a suitable hydrogenation apparatus containing an iron type hydrocarbon synthesis catalyst and sealed. The temperature of the primary water was then brought to about 125° C., after which the pressure was increased to approximately 450 p. s. i. by the introduction of hydrogen into the reaction chamber. The resulting mixture contained about one volume of hydrogen for each volume of primary water and had the following approximate composition:

| Component | Moles |
| --- | --- |
| $CH_3CHO$ | .21 |
| $CH_3CH_2OH$ | 1.33 |
| $CH_3COOH$ | .37 |
| $H_2O$ | 46.47 |
| $CH_3COCH_3$ | .20 |
| $H_2$ | 50.00 |
| $CO_2$ | 0 |
| Other chemicals | 1.42 |

The iron catalyst was employed in a concentration of approximately 1 pound of catalyst for each 0.2 to 0.5 mole of the reaction mixture. During the course of the reaction, sufficient hydrogen was introduced to maintain a pressure of approximately 450 p. s. i., while the reaction mixture was constantly agitated. When the reaction reached completion, as evidenced by failure of further hydrogen absorption, the reaction mixture was withdrawn from the apparatus and analyzed. Analysis indicated a product mixture of the following composition with a percentage gain in ethanol of 33 weight per cent over that present in the original feed as shown below:

| Component | Reaction Mixture, Moles | Product Mixture, Moles | Percent Gain |
| --- | --- | --- | --- |
| $CH_3CHO$ | .21 | .00113 | |
| $CH_3CH_2OH$ | 1.33 | 1.77 | 33 |
| $CH_3COOH$ | .37 | .122 | |
| $H_2O$ | 46.47 | 46.71 | |
| $CH_3COCH_3$ | .20 | .21 | |
| $H_2$ | 50.00 | 49.33 | |
| $CO_2$ | 0 | .01 | |
| Other chemicals | 1.42 | 1.42 | |

EXAMPLE III

A primary water stream from a hydrocarbon synthesis operation at 315° C. and 450 p. s. i. pressure was mixed with hydrogen in a ratio of 1:1 at 205° C. and 450 p. s. i. pressure to produce a feed mixture having the same composition as that employed in Example I. The resulting mixture was then introduced into a synthesis unit at a linear velocity of about 1 ft. per second thereby maintaining the iron catalyst present in said unit in a dense suspended turbulent condition. The temperature of the synthesis zone during the reaction was matained at about 315° C., while the pressure was held at about 450 p. s. i. Analysis of the synthesis tail gas indicated a product mixture of the following composition with a percentage gain in ethanol and acetone of 10 and 75 weight per cent, respectively, over the concentration of these compounds present in the original feed as shown below:

| Component | Reaction Mixture, Moles | Product Mixture, Moles | Percent Gain |
| --- | --- | --- | --- |
| $CH_3CHO$ | .21 | .080 | |
| $CH_3CH_2OH$ | 1.33 | 1.47 | 10 |
| $CH_3COOH$ | .37 | .06 | |
| $H_2O$ | 46.47 | 46.63 | |
| $CH_3COCH_3$ | .20 | .35 | 75 |
| $H_2$ | 50.00 | 49.85 | |
| $CO_2$ | 0 | .15 | |
| Other chemicals | 1.42 | 1.42 | |

As noted in Example I the concentration of "other chemicals" remained the same; however, the percentage increase in alcohols and ketones in this fraction was in proportion to that observed in the case of ethanol and acetone.

EXAMPLE IV

A primary water stream from a hydrocarbon synthesis operation at 315° C. and 450 p. s. i. pressure having the composition indicated in Example I was mixed at 213° C. and 550 p. s. i. pressure with hydrogen in a ratio of four volumes of the latter to one volume of primary water to give a reaction mixture having the following composition:

| Component | Reaction Mixture, Moles |
| --- | --- |
| $CH_3CHO$ | .08 |
| $CH_3CH_2OH$ | .53 |
| $CH_3COOH$ | .15 |
| $H_2O$ | 18.59 |
| $CH_3COCH_3$ | .08 |
| $H_2$ | 80.00 |
| $CO_2$ | 0 |
| Other chemicals | .57 |

The resulting feed was then introduced into a synthesis unit where it was brought into contact with a fluidized iron catalyst. The catalyst was maintained in a suspended turbulent state by introducing the reaction mixture at a linear velocity of about 1.5 ft. per second. The temperature of the synthesis zone during the reaction was maintained at about 315° C., while the pressure was held at a level of about 550 p. s. i. Analysis of the synthesis tail gas indicated a product mixture of the following composition with a percentage gain in ethanol and acetone of 31 and 25 weight per cent, respectively, over the concentration of these compounds present in the original feed as shown below:

| Component | Reaction Mixture, Moles | Product Mixture, Moles | Percent Gain |
| --- | --- | --- | --- |
| $CH_3CHO$ | .08 | .019 | |
| $CH_3CH_2OH$ | .53 | .696 | 31 |
| $CH_3COOH$ | .15 | .008 | |
| $H_2O$ | 18.59 | 18.72 | |
| $CH_3COCH_3$ | .08 | .10 | 25 |
| $H_2$ | 80.00 | 79.92 | |
| $CO_2$ | 0 | .02 | |
| Other chemicals | .57 | .57 | |

The example which follows demonstrates the ability of the process of our invention to convert mixtures of acids into aldehydes and alcohols in accordance with the conditions herein set forth.

EXAMPLE V

A mixture of organic acids in the form of a 4.5 weight per cent aqueous solution, 60 per cent of which consisted of acetic acid, 20 per cent propionic acid, and 20 per cent of butyric and higher acids, was mixed at 152° C. and 400 p. s. i. pressure with hydrogen in a ratio of four volumes of the latter to one volume of dilute acid solution. The mixture thus obtained was then introduced into a synthesis unit where it was brought into contact with a fluidized iron mill-scale hydrocarbon synthesis catalyst. The catalyst was maintained in a suspended turbulent state by introducing the reaction mixture at a rate of 64.5 S. C. F. H. per pound of catalyst. The temperature of the synthesis zone during the reaction was maintained at about 315° C. while the pressure was held at a level of about 400 p. s. i. Analysis of the synthesis tail gas indicated 92.5 per cent conversion of acetic acid, 96.5 per cent conversion of propionic acid and 95 per cent conversion of butyric and higher acids. The product mixture obtained had the following composition:

| Component | Product Mixture, Moles |
|---|---|
| $CH_3CHO$ | 0.042 |
| $CH_3CH_2CHO$ | 0.032 |
| $CH_3CH_2CH_2CHO$ | 0.020 |
| $CH_3CH_2OH$ | 0.658 |
| $CH_3CH_2CH_2OH$ | 0.180 |
| $CH_3CH_2CH_2CH_2OH$ and heavier | 0.002 |
| $CH_3COOH$ | 0.064 |
| $CH_3CH_2COOH$ | 0.008 |
| $CH_3CH_2CH_2COOH$ and heavier | 0.008 |
| Other chemicals | [1] 0.056 |
| $H_2O$ | 98.93 |

[1] Contained aldehydes and alcohols heavier than $C_4$.

From the foregoing examples it is clear that we have provided a process for increasing both the individual and combined yields of alcohols and ketones originally present in feed mixtures of the type herein set forth. Our invention further contemplates application of the principles specifically disclosed above to the treatment of any mixture of chemicals in which compounds of the classes taught herein, viz., alcohols, aldehydes, ketones, and acids, are present and the source from which such mixtures are derived is immaterial. In this connection it is to be strictly understood that the process of our invention may be employed in the production of alcohols and ketones in general, i. e., aliphatic, cycloaliphatic, aromatic, and the like. In general, it may be said that our invention covers a method for altering the concentration of one or more of the above-mentioned classes of compounds contained in a mixture thereof by treating said mixture with hydrogen under conditions such that the desired conversion is effected in the substantial absence of hydrocarbon synthesis.

What we claim is:

1. A process for increasing the proportion of at least one of the classes of compounds designated as alcohols and ketones present in a dilute aqueous mixture of aldehydes and carboxylic acids, which comprises contacting said mixture with a hydrocarbon synthesis catalyst in the presence of a gas consisting essentially of hydrogen at pressures which vary from about 15 to about 100 p. s. i. and at temperatures of from about 125° to about 175° C., where it is desired to increase the proportion of ketones, to a pressure of at least about 200 p. s. i. within the above-recited temperature range where it is desired to increase the quantity of alcohols, whereby in accomplishing the aforesaid results from about 25 to about 95 per cent of the acids present in said mixture are converted into at least one of said classes of compounds, and recovering a mixture in which at least one of the classes of compounds designated as alcohols and ketones is present in increased ratio to the aldehydes and acids originally present in said aqueous mixture.

2. A process for increasing the proportion of at least one of the classes of compounds designated as alcohols and ketones present in a dilute aqueous mixture of aldehydes and carboxylic acids, which comprises contacting said mixture with an iron hydrocarbon synthesis catalyst in the form of a fluidized bed in the presence of a gas consisting essentially of hydrogen at pressures which vary from about 15 to about 100 p. s. i. and at temperatures of from about 125° to about 175° C., where it is desired to increase the proportion of ketones, to a pressure of at least about 200 p. s. i. within the above-recited temperature range where it is desired to increase the quantity of alcohols, whereby in accomplishing the aforesaid results from about 25 to about 95 per cent of the acids present in said mixture are converted into at least one of said classes of compounds, and recovering a mixture in which at least one of the classes of compounds designated as alcohols and ketones is present in increased ratio to the aldehydes and acids originally present in said aqueous mixture.

3. The process of claim 2 in which a dilute aqueous mixture is employed containing from about 5 to 15 weight per cent of ketones, aldehydes, acids, and alcohols.

4. A process for increasing the proportion of at least one of the classes of compounds designated as alcohols and ketones present in a dilute aqueous mixture of aldehydes and carboxylic acids, which comprises contacting said mixture with an iron hydrocarbon synthesis catalyst in the liquid phase and in the presence of a gas consisting essentially of hydrogen at pressures which vary from about 15 to about 100 p. s. i. and at temperatures of from about 125° to about 175° C., where it is desired to increase the proportion of ketones, to a pressure of at least about 200 p. s. i. within the above-recited temperature range where it is desired to increase the quantity of alcohols, whereby in accomplishing the aforesaid results from about 25 to about 95 per cent of the acids present in said mixture are converted into at least one of said classes of compounds, and recovering a mixture in which at least one of the classes of compounds designated as alcohols and ketones is present in increased ratio to the aldehydes and acids originally present in said aqueous mixture.

5. A process for increasing the proportion of at least one of the classes of compounds designated as alcohols and ketones present in a dilute aqueous mixture of aldehydes and carboxylic acids, which comprises condensing a vaporous product mixture from a hydrocarbon synthesis into an oil phase and a water phase, separating said phases, thereafter contacting said water phase containing aldehydes, alcohols, ketones and acids with a hydrocarbon synthesis catalyst in the presence of a gas consisting essentially of hydrogen at pressures which vary from about 15 to about 100 p. s. i. and at temperatures of from about 125° to about 175° C., where it is desired to increase the proportion of ketones, to a pressure of at least about 200 p. s. i. within the above-recited temperature range where it is desired to increase the quantity of alcohols, whereby in accomplishing the aforesaid results from about 25 to about 95 per cent of the acids present in said mixture are converted into at least one of said classes of compounds, and recovering a mixture in which at least one of the classes of compounds designated as alcohols and ketones is present in increased ratio to the aldehydes and acids originally present in said aqueous mixture.

6. A process for increasing the proportion of at least one of the classes of compounds designated as oil-soluble alcohols and ketones present in the mixture of oil-soluble aldehydes and carboxylic acids, which comprises contacting said mixture with a hydrocarbon synthesis catalyst in the presence of a gas consisting essentially of hydrogen at pressures which vary from about 15 to about 100 p. s. i. and at temperatures of from about 125° to about 175° C., where it is desired to increase the proportion of ketones; to a pressure of at least about 200 p. s. i. within the above-recited temperature range where it is desired to increase the quantity of alcohols, whereby in accomplishing the aforesaid results from about 25 to about 95 per cent of the acids present in said mixture are converted into at least one of said classes of compounds, and recovering a mixture in which at least one of the classes of compounds designated as alcohols and ketones is present in increased ratio to the aldehydes and acids originally present in said aqueous mixture.

7. A process for increasing the concentration of alcohols and ketones present in a dilute aqueous mixture containing aldehydes and acids, which comprises contacting said mixture with a hydrogenation catalyst in the presence of a gas consisting essentially of hydrogen at a temperature of from about 285° to about 350° C. at pressures of about 200 to 600 p. s. i., and recovering alcohols and ketones in increased ratio to acids and aldehydes present in the mixture thus treated.

8. A process for increasing the concentration of alcohols and ketones present in a dilute aqueous fraction containing aldehydes and acids, which comprises contacting said fraction with an iron hydrocarbon synthesis catalyst in the presence of a gas consisting essentially of hydrogen at a temperature of from about 285° to about 350° C. at pressures of about 200 to 600 p. s. i. whereby said aldehydes and acids are at least partially converted into alcohols and ketones, recovering alcohols and ketones in increased ratio to aldehydes and acids present in said fraction, separating said alcohols and ketones from said fraction, and repeating the above cycle by subjecting said fraction containing aldehydes and acids to catalytic hydrogenation under the aforesaid conditions of temperature and pressure.

9. A process for increasing the concentration of alcohols present in a dilute aqueous fraction containing acids and aldehydes, which comprises contacting said fraction with an iron hydrocarbon synthesis catalyst in the presence of a gas consisting essentially of hydrogen at a temperature of from about 125° to about 175° C. and at a pressure of from about 200 to 600 p. s. i. whereby said aldehydes are at least partially converted into alcohols and whereby from about 65 to about 95 per cent of said acids are converted into alcohols, and recovering said alcohols in increased ratio to aldehydes and acids.

10. A process for increasing the concentration of ketones present in a dilute aqueous fraction containing alcohols, aldehydes, and acids, which comprises contacting said fraction with an iron hydrocarbon synthesis catalyst in the presence of a gas consisting essentially of hydrogen at a temperature of from about 125° to about 175° C. and at a pressure of from about 15 to about 100 p. s. i. whereby said alcohols, aldehydes, and acids are at least partially converted into ketones, and recovering said ketones in increased ratio to alcohols, aldehydes, and acids.

11. A process for converting to ketones the aldehydes, alcohols, and acids present in a dilute aqueous mixture thereof, which comprises contacting said mixture with a hydrocarbon synthesis catalyst in the presence of a gas consisting essentially of hydrogen at a temperature of from about 125° to about 175° C. and at a pressure of from about 15 to about 100 p. s. i. whereby said aldehydes, alcohols, and acids are at least partially converted into ketones, recovering said ketones in increased ratio to the remaining mixture of aldehydes, alcohols, and acids, separating said ketones from said mixture, thereafter contacting said mixture with a hydrogenation catalyst under the aforesaid conditions of temperature and pressure to produce additional quantities of ketones, separating the ketones thus formed, and repeating the above cycle until substantially all of the aldehydes, acids, and alcohols have been converted into ketones.

12. A process for substantially completely converting to alcohols the aldehydes and acids present in a hydrocarbon synthesis primary water fraction, which comprises contacting said fraction with a hydrocarbon synthesis catalyst in the presence of a gas consisting essentially of hydrogen at a temperature of from about 125° to about 175° C. and at a pressure of from about 200 to about 600 p. s. i., whereby from about 65 to about 95 per cent of the acids present in said primary water fraction are converted into alcohols, recovering said alcohols in increased ratio to aldehydes and acids present in said fraction, separating alcohols from said fraction, thereafter contacting the latter with a hydrocarbon synthesis catalyst under the aforesaid conditions of temperature and pressure to produce additional quantities of alcohols, and repeating the above cycle until substantially all of said aldehydes and acids have been substantially completely converted into alcohols.

13. In a process for converting a mixture of organic acids to aldehydes and alcohols, the step which comprises contacting said mixture with a hydrocarbon synthesis catalyst in the presence of a gas consisting essentially of hydrogen at a temperature of from about 285° to about 360° C. at pressures of 200 p. s. i. and above, whereby up to from about 92 to about 96 per cent of the organic acids present in said mixture are converted into aldehydes and alcohols.

14. A process for increasing the concentration of alcohols present in a dilute aqueous fraction containing aldehydes and acids, which comprises contacting said fraction with an iron hydrocarbon synthesis catalyst in the liquid phase and in the presence of a gas consisting essentially of hydrogen at temperatures of from about 125° to about 175° C. and at pressures of from about 200 to about 600 p. s. i. whereby aldehydes are at least partially converted into alcohols and whereby from about 65 to about 95 per cent of said acids present in said fraction are converted into alcohols, and recovering said alcohols in increased ratio to aldehydes and acids.

15. A process for increasing the concentration of ketones present in a dilute aqueous fraction containing aldehydes, alcohols, and acids, which comprises contacting said fraction with an iron catalyst in the liquid phase and in the presence of a gas consisting essentially of hydrogen at a temperature of from about 125° to about 175° C. and at a pressure of from about 15 to about 100 p. s. i. whereby alcohols, acids, and aldehydes are at least partially converted into ketones, and recovering said ketones in increased ratio to alcohols, aldehydes, and acids.

KAROL L. HUJSAK.
RICHARD MUNGEN.

References Cited in the file of this patent

UNITED STATES PATENTS

| Number | Name | Date |
|---|---|---|
| 1,684,640 | Schmidt et al. | Sept. 18, 1928 |
| 1,979,841 | Pier et al. | Nov. 6, 1934 |
| 2,059,495 | Smeykal | Nov. 3, 1936 |
| 2,171,324 | Zetzsche | Aug. 29, 1939 |
| 2,205,184 | Woodhouse | June 18, 1940 |
| 2,464,916 | Adams et al. | Mar. 22, 1949 |
| 2,516,940 | Arnold et al. | Aug. 1, 1950 |
| 2,516,958 | Coley | Aug. 1, 1950 |
| 2,543,038 | McGrath | Feb. 27, 1951 |
| 2,569,380 | Holder | Sept. 25, 1951 |